United States Patent
Martinez et al.

(10) Patent No.: US 10,216,498 B2
(45) Date of Patent: Feb. 26, 2019

(54) CUSTOM-BUILT PROCESS ENGINE WITH MINIMAL MEMORY AND DISK RESOURCE CONSUMPTION

(71) Applicant: TIBCO Software Inc., Palo Alto, CA (US)

(72) Inventors: Francisco Martinez, Somerville, MA (US); Rajeev Kozhikkattuthodi, San Jose, CA (US)

(73) Assignee: TIBCO Software Inc., Palo Alto, CA (US)

( * ) Notice: Subject to any disclaimer, the term of this patent is extended or adjusted under 35 U.S.C. 154(b) by 140 days.

(21) Appl. No.: 15/274,120

(22) Filed: Sep. 23, 2016

(65) Prior Publication Data

US 2017/0329586 A1 Nov. 16, 2017

Related U.S. Application Data

(60) Provisional application No. 62/336,475, filed on May 13, 2016.

(51) Int. Cl.
*G06F 9/44* (2018.01)
*G06F 8/41* (2018.01)
*G06F 9/48* (2006.01)
*G06F 9/50* (2006.01)
*G06F 8/30* (2018.01)

(52) U.S. Cl.
CPC ............ *G06F 8/4434* (2013.01); *G06F 8/30* (2013.01); *G06F 9/4843* (2013.01); *G06F 9/5016* (2013.01)

(58) Field of Classification Search
None
See application file for complete search history.

(56) References Cited

U.S. PATENT DOCUMENTS

| | | | |
|---|---|---|---|
| 7,299,346 B1 * | 11/2007 | Hollis | G06F 9/4401 713/1 |
| 7,509,639 B2 * | 3/2009 | Worley, Jr. | G06F 9/468 713/164 |
| 7,765,541 B1 * | 7/2010 | Noordergraaf | G06F 8/60 717/124 |
| 7,900,200 B1 | 3/2011 | Violleau | |
| 7,971,182 B1 * | 6/2011 | Vlaovic | G06F 8/71 717/104 |

(Continued)

FOREIGN PATENT DOCUMENTS

| | | |
|---|---|---|
| WO | WO-2011011120 | 1/2011 |
| WO | WO-2015002581 | 1/2015 |
| WO | WO-2016048208 | 3/2016 |

OTHER PUBLICATIONS

Cappiello et al., MicroMAIS: Executing and Orchestrating Web Services on Constrained Mobile Devices, Software: Practice and Experience, pp. 1-35, 2011.

*Primary Examiner* — Insun Kang
(74) *Attorney, Agent, or Firm* — McGuireWoods LLP (57) ABSTRACT

A minimum set of process engine components needed to perform a process application is determined. An executable code that includes the determined minimum set of process engine components and omits at least a subset of process engine components not included in the determined minimum set of process engine components is compiled. The executable code is deployed to a device.

17 Claims, 5 Drawing Sheets

(56) References Cited

U.S. PATENT DOCUMENTS

| | | | |
|---|---|---|---|
| 8,219,987 B1* | 7/2012 | Vlaovic | G06F 9/448 |
| | | | 718/1 |
| 8,458,658 B2* | 6/2013 | Faus | G06F 8/61 |
| | | | 717/106 |
| 8,984,259 B2 | 3/2015 | Hulse | |
| 9,021,490 B2 | 4/2015 | Marchand | |
| 9,614,931 B2* | 4/2017 | Bookman | H04L 67/34 |
| 2004/0010734 A1* | 1/2004 | Ghercioiu | G06F 8/61 |
| | | | 714/38.13 |
| 2004/0015943 A1* | 1/2004 | Chen | G06F 8/65 |
| | | | 717/168 |
| 2007/0220509 A1* | 9/2007 | Shwartz | G06F 8/61 |
| | | | 717/174 |
| 2008/0235710 A1* | 9/2008 | Challenger | G06F 9/5027 |
| | | | 719/316 |
| 2009/0165010 A1 | 6/2009 | Poddar | |
| 2010/0318985 A1* | 12/2010 | Moffatt | G06F 8/65 |
| | | | 717/175 |
| 2010/0332876 A1* | 12/2010 | Fields, Jr. | G06F 1/3203 |
| | | | 713/323 |
| 2011/0202908 A1* | 8/2011 | Kim | G06F 9/45516 |
| | | | 717/148 |
| 2013/0041706 A1 | 2/2013 | Joshi | |
| 2013/0067461 A1* | 3/2013 | Taragin | G06F 8/61 |
| | | | 717/176 |
| 2013/0212600 A1 | 8/2013 | Harsh | |
| 2014/0007140 A1* | 1/2014 | Hall | G06F 9/4443 |
| | | | 719/328 |
| 2016/0094483 A1* | 3/2016 | Johnston | H04L 47/827 |
| | | | 709/226 |
| 2016/0210173 A1* | 7/2016 | Bookman | H04L 67/06 |
| 2017/0262272 A1* | 9/2017 | Asare | G06F 8/61 |

* cited by examiner

CUSTOM-BUILT PROCESS ENGINE WITH MINIMAL MEMORY AND DISK RESOURCE CONSUMPTION

CROSS REFERENCE TO OTHER APPLICATIONS

This application claims priority to U.S. Provisional Patent Application No. 62/336,475 entitled CUSTOM-BUILT PROCESS ENGINE WITH MINIMAL MEMORY AND DISK RESOURCE CONSUMPTION filed May 13, 2016 which is incorporated herein by reference for all purposes.

BACKGROUND OF THE INVENTION

Traditional process engines are general-purpose, monolithic server software that load custom process applications designed by application developers. Process engines include the complete set of functional capabilities required by any application developer. Traditional process engines are built for functional completeness, resulting in larger, less-than-optimal memory and disk footprints for any specific process application. Consequently, traditional process engines may not be suitable for resource-constrained environments, such as embedded computing and Internet of Things (IoT) environments, in which resources such as physical memory, compute and storage resources, etc. may be limited and which may lack direct network access to repositories. It would be useful to create a process engine that is suitable for resource-constrained environments.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Techniques to create and provide a process application comprising a custom process engine are disclosed. Custom process engines are created that only include the capabilities required by a particular process application. A process application includes one or more process flows. Each process flow may include a trigger followed by one or more activities. The triggers and activities may be defined by individual sets of code, which may include references to libraries, components, and/or functions. The triggers and activities may be created by a developer without concern as to the process application to which they would be deployed. As a result, a combination of triggers and activities may include dependencies that are unused and/or unnecessary for a particular process application. To reduce the size and footprint of the process engine created from the compiled process application, the triggers and activities may be analyzed to determine a minimal set of components necessary to create a process engine that will execute the process application.

In various embodiments, a process application comprising a custom process engine as disclosed herein may have a smaller memory footprint and/or may be faster to load, e.g., as compared to an application or environment in which a more general purpose (non-custom) process engine is used. When the process application including such a custom process engine is compiled, the resulting executable file may have a relatively small footprint because the size occupied by the custom process engine in computer RAM memory is smaller than that of traditional process engines. Such a technique also creates a process application that is lightweight because the executable that is downloaded to a device is smaller than in size than the executable of traditional process engines. A device to which a process application comprising such a custom process engine is deployed may be able to start up faster because fewer components are needed to initialize upon startup due to there being less dependencies in the custom process engine.

Figure 1:
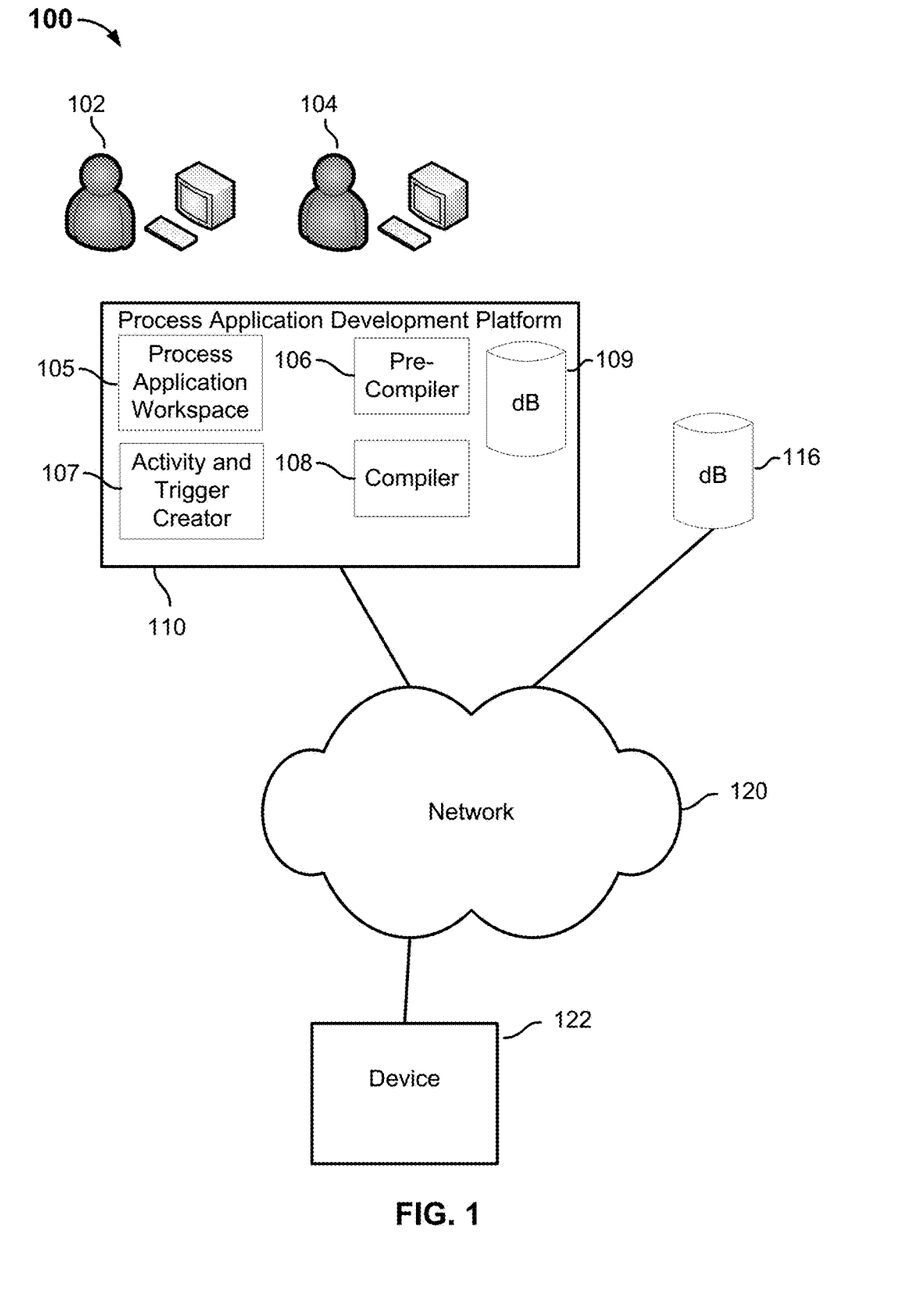
FIG. 1 is a block diagram illustrating an embodiment of a system for creating custom process engines.

FIG. 1 is a block diagram illustrating a system 100 for creating process applications that include custom process engines. In the example shown, the system 100 includes a process application development platform 110, a remote database 116, a network 120, and a device 122.

The process application development platform 110 may include a process application workspace 105, a pre-compiler 106, an activity and trigger creator 107, a compiler 108, and/or a database 109. The process application development platform 110 may be implemented using one or more computing devices, such as a computer, a multi-processor system, a microprocessor-based system, a cloud-based system, a special purpose device, a distributed computing environment including any of the foregoing systems or devices, or other appropriate hardware/software/firmware combination that includes one or more processors, and memory coupled to the processors and configured to provide the processors with instructions.

The process application workspace 105 is a user interface that allows an integrator 104 to create one or more process flows that are to be included in a process application. In some embodiments, the one or more process flows can be created by a visual or a text editor.

The pre-compiler 106 analyzes one or more process flows of a process application created by an integrator 104 and determines a minimal set of components needed to execute the process application. The compiler 108 compiles the process application into an executable. The resulting compiled code is packaged and made available to be deployed (e.g., by download, etc.) as an executable binary. The executable when executed on a device, such as device 122, is a custom process engine that controls how the device 122 operates. The database 109 stores activities and triggers created by one or more developers, such as developer 102. The database 109 may be a memory and/or storage device internal to the process application development platform 110, a memory and/or device attached to the process engine developer 110, or any memory and/or storage device connected to the process engine developer 110 via a network connection. The network connection may be a wired or wireless connection.

The process application development platform 110 is accessible by a developer 102 and/or an integrator 104. Developer 102 may be a person or other entity, such as a software developer, that creates activities and triggers. The developer 102 may create an activity and/or a trigger using the activity and trigger creator 107. Each activity and trigger created by a developer may be a self-contained piece of code functionality that is created via a programming language, such as Go, Python, C, C++, etc. The triggers and activities stored in dB 109, 116 may be created by a plurality of developers, each of the developers unaware of how the triggers and activities will be combined, e.g., by others at a later time, to form a process flow. The triggers and activities created by a developer may include functions or process components that are unused by a process flow created by an integrator. An integrator 104 may be an entity, such as a software developer that creates a process application via process application workspace 105 comprised of one or more process flows for a specific purpose. For example, the integrator may create a process flow for a device to perform a system update, to perform a specific function, to perform a diagnostic test, etc. The integrator selects a trigger to initiate a process flow and one or more activities to be invoked after the trigger. The integrator may create a second process flow that branches off from an activity of the first process flow or may create a second process flow that is based on the output of the trigger.

Remote database 116 stores triggers and activities created by other developers. For example, the remote database 116 may be an open-source database, such as GitHub®. The integrator 104 may select triggers and activities stored at the remote database 116 for a process flow. The selected triggers and activities are imported to the process application development platform 110.

Network 120 connects process application development platform 110 to remote database 116 and device 122. Network 120 comprises one or more of the following: a local area network, a wired network, a wireless network, the Internet, an intranet, or any other appropriate communication network.

Device 122 is a target device to execute the custom process engine. For example, the device 122 may be a mobile device, an interconnected device, an IoT device, or any device executing a process engine. After the process application is compiled, the executable custom process engine may be deployed to the device 122. The custom process engine, when executed by the device 122, controls the behavior of the device.

Figure 2:
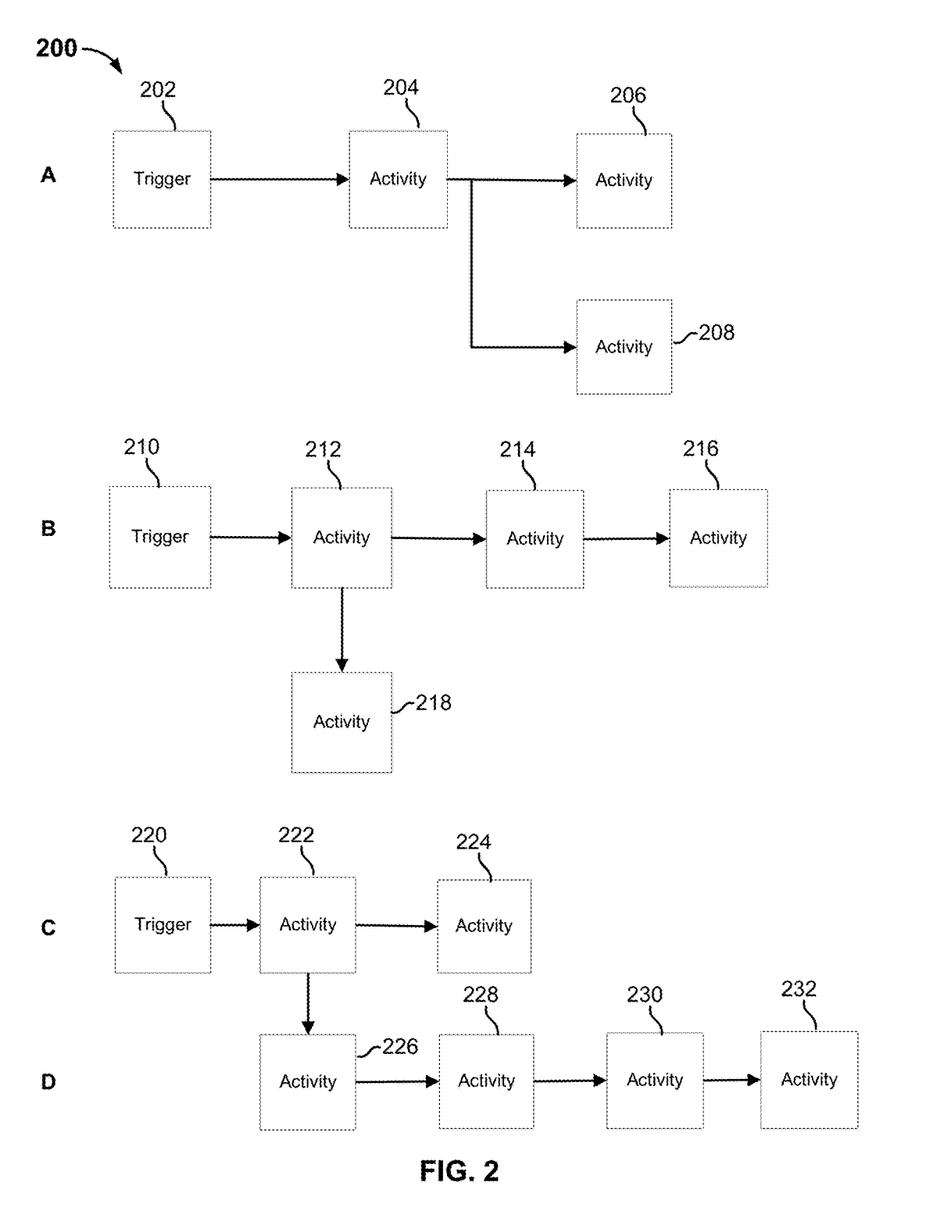
FIG. 2 is a flow chart illustrating an embodiment of a process application workspace.

FIG. 2 is flow chart illustrating an embodiment of a process application workspace 200. In some embodiments, the process application workspace 200 can be implemented using process application workspace 105. A process application is comprised of one or more process flows, each process flow comprised of a trigger and one or more activities. Non-limiting examples of activities include a counter activity, a log activity, a rest activity, a Constrained Application Protocol (CoAP) activity, and a Hyper Text Transfer Protocol (HTTP) activity.

In the example shown, the process application 200 includes a process flow A, a process flow B, a process flow C, and a process flow D. Process flow A begins with a trigger 202 and further includes activity 204, activity 206, and activity 208. Process flow B is comprised of trigger 210, activity 212, activity 214, activity 216, and activity 218. Process flow C is comprised of trigger 220, activity 222, and activity 224. Process flow D is comprised of trigger 220, activity 222, activity 226, activity 228, activity 230, and activity 232. Process flows generally begin with a trigger and are followed by one or more activities that use the output of preceding triggers and activities as inputs.

In some embodiments, the process flow includes multiple paths. For example, process flow A is comprised of trigger 202, activity 204, activity 206, and activity 208. Activity 204 may output a value that is used by activity 206 or activity 208. Depending upon the output of activity 204, activity 206 may be invoked or activity 208 may be invoked.

In other embodiments, the process flow can include activities that are not invoked by a process flow. For example, process flow B is comprised of trigger 210, activity 212, activity 214, activity 216, and activity 218. Activity 212 may output a value that is used by activity 214, which outputs a value that is used by activity 216. An integrator may create process flow B and decide to include activity 218 in the process flow. However, unbeknownst to the integrator, activity 218 needs certain input to execute that is not the output of trigger 210 or activity 212. In such a scenario, the pre-compiler determines the unused activity in the process flow and removes any components associated with the unused activity from the process flow. When the process application is subsequently compiled by a compiler, the custom process engine will require less memory and have a smaller footprint because it does not include any dependencies and components required by activity 218. In some embodiments, the outputs from triggers and activities are passed through to subsequent activities. For example, activity 212 may output a value that is not used by the activity 214, but is used by activity 216. In such a scenario, the custom process engine, when executed on a device, may perform activity 216 before or concurrently with activity 214.

In some embodiments, a process flow of a plurality of process flows is not invoked by the process application. For example, an integrator may create process flow C. The integrator may add trigger 220, activity 222, and activity 224 to create process flow C. The integrator may also decide to create process flow D, which is another process flow based on the output of trigger 220. In addition to trigger 220 and activity 222, process flow D may include activity 226, activity 228, activity 230, and activity 232. However, unbeknownst to the integrator, activities 226, 228, 230, and 232 require certain input values that are not the output of trigger 220 or activity 222. In such a scenario, the pre-compiler detects the unused activities in the process flow and removes any components associated with the unused activities from the process flow, which in this case, effectively removes process flow D from the process application. When the process application is subsequently compiled by a compiler, the custom process engine will require less memory and have a smaller footprint because custom process engine does not include the dependencies and components required by process flow D, but the custom process engine will still include the dependencies and components required by process flow C.

Figure 3:
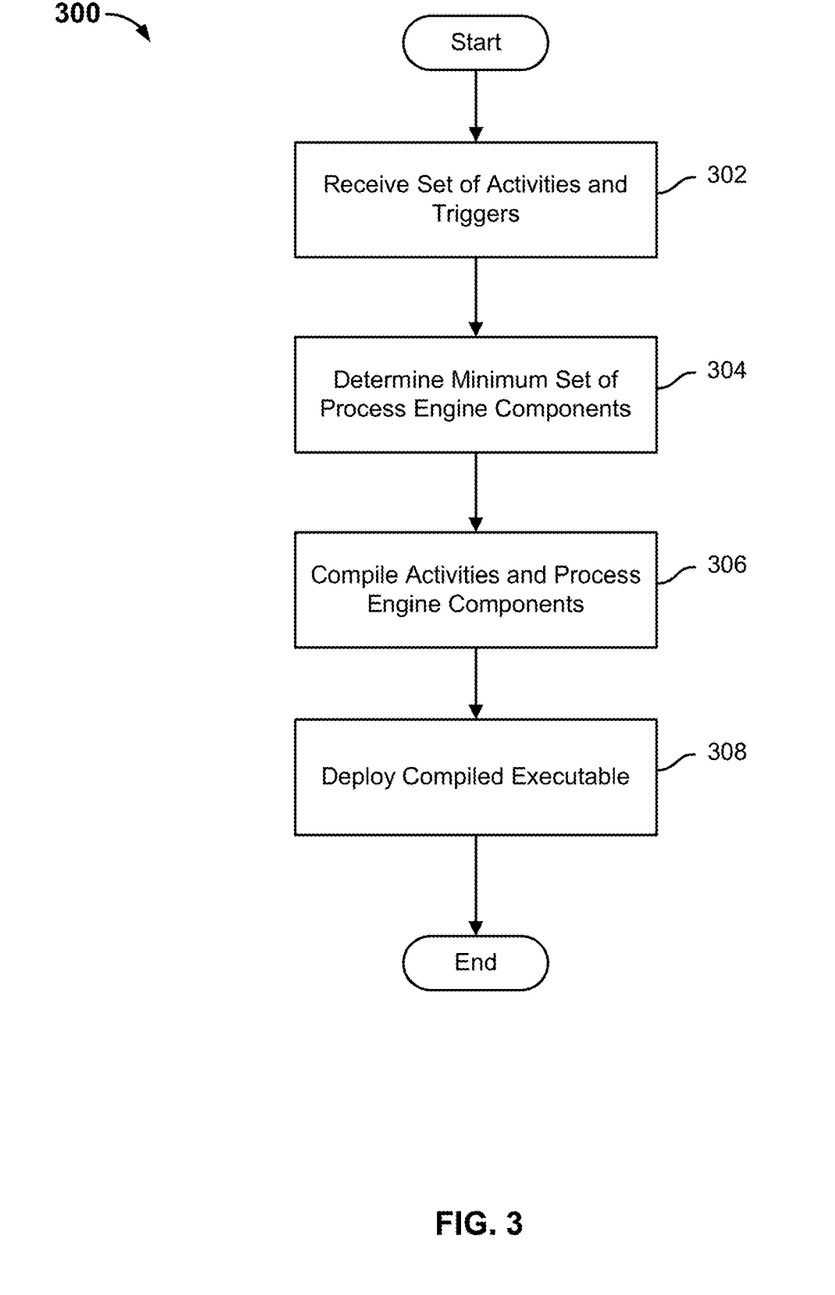
FIG. 3 is a flow chart illustrating an embodiment of creating a custom process engine.

FIG. 3 is a flow chart illustrating an embodiment of creating a custom process engine. In some embodiments, the process 300 of FIG. 3 may be implemented by a process application development platform, such as process application development platform 110.

In 302, a set of activities and triggers are received to create one or more process flows of the process application. An integrator is provided with the ability to select activities and triggers via a user interface, such as for example, a Flogo® interface. In some embodiments, the integrator is provided with a list of available activities and triggers and selects one or more activities and triggers from the list. In other embodiments, the integrator is able to search for available activities and triggers from a local database and selects one or more activities from the search results of the search. In other embodiments, the integrator is able to search a remote database for available activities and triggers and selects one or more activities and triggers from the remote database. In other embodiments, the integrator via a command line interface is able to search for available activities and triggers and select one or more activities and triggers.

In 304, a minimum set of process engine components for the process application is determined. The minimum set of process engine components is the minimum number of process engine components that are actually required to support the one or more process flows defined by the integrator for the process application. An activity or trigger may include components that are unused by the process application. Such components are identified and removed.

A trigger and/or activity may be associated with one or more bindings necessary to carry out the process application. For example, a binding may be a HTTP binding, a MQTT binding, a WebSockets binding, a CoAP binding, a FTL binding, etc. The bindings that are actually invoked by the process application are identified and added to the process application.

In 306, the triggers and activities comprising the process application are compiled into an executable binary. In some embodiments, process engine components associated with the triggers and activities not referenced by the process application are ignored and excluded from the executable. The bindings that are actually invoked by the process application are identified and added to the executable.

In 308, the executable comprising the custom process engine is deployed to a device. Since the unused process engine components are removed from the executable, the custom process engine, when executed by a device, may be brought online more quickly. In some embodiments, the executable is deployed via a wireless connection and downloaded to the device. In other embodiments, the executable is deployed to a physical memory device and transferred to the device. In other embodiments, the executable is deployed via a wired connection to the device.

Figure 4:
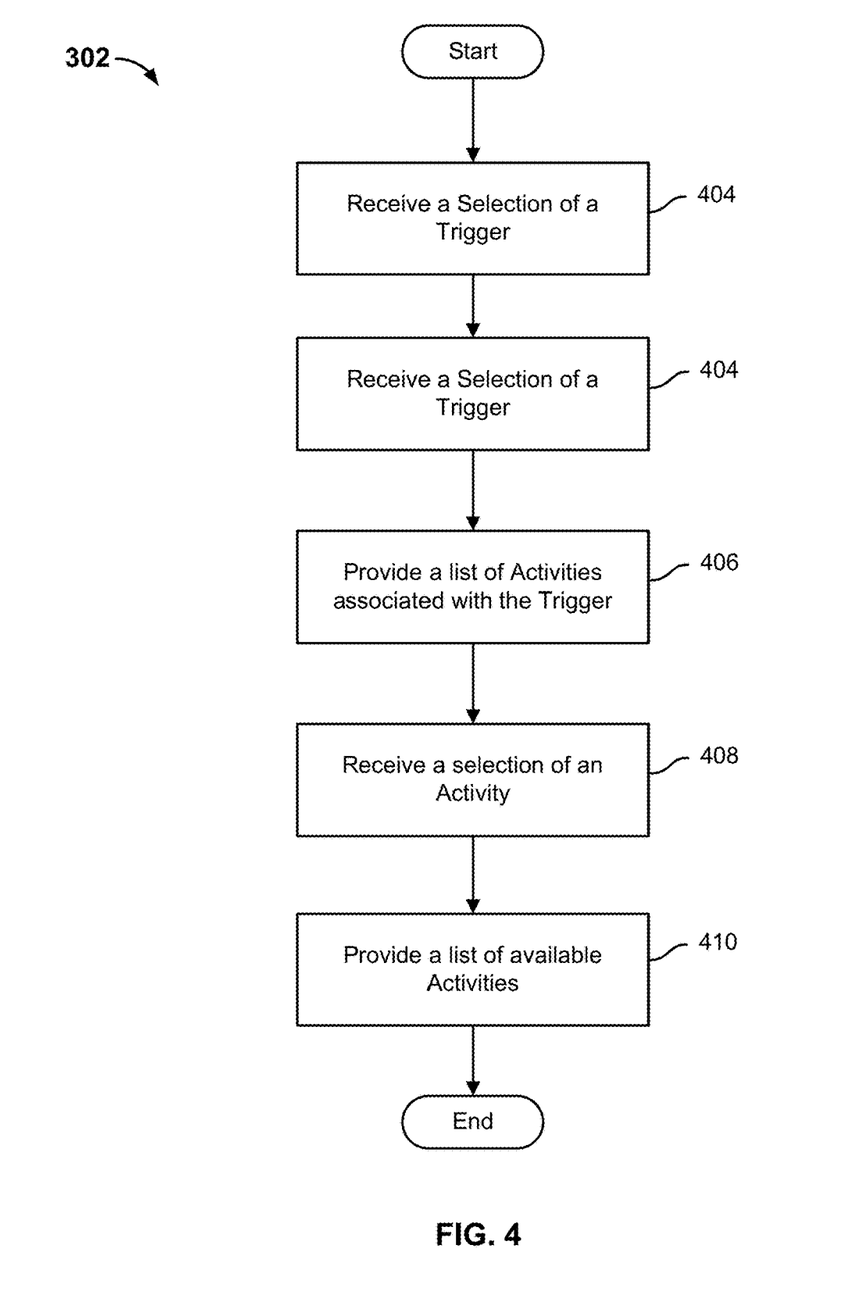
FIG. 4 is a flow chart illustrating an embodiment of receiving a set of activities and triggers.

FIG. 4 is a flow chart illustrating an embodiment of receiving a set of activities and triggers. In some embodiments, the process of FIG. 4 may be performed by a process application development platform, such as process application development platform 110. In some embodiments, the process of FIG. 4 may be implemented to perform step 302 of FIG. 3.

In 402, a list of available triggers is provided via a user interface of the process application development platform. A database, such as database 109 and remote database 116, store a set of triggers. In some embodiments, the integrator is provided with a list of available triggers. In other embodiments, the integrator is able to search for an available trigger from a local database or a remote database. In other embodiments, the integrator is able to search for available triggers via a command line interface.

In 404, a selection of a trigger is received via a user interface of the process application development platform. In some embodiments, the integrator is able to select a trigger from the list. In other embodiments, the integrator is able to select the trigger from the search results of the search. In other embodiments, the integrator is able to select a trigger from the remote database. In other embodiments, the integrator is able to select to drag and drop the trigger into a process application workspace. In other embodiments, the integrator is able to select an available trigger via a command line interface.

In 406, a list of available activities associated with the selected trigger is provided via a user interface of the process application development platform. A database, such as database 109 and remote database 116, store a set of activities. In some embodiments, all of the available activities are presented via the user interface. In other embodiments, the integrator is able to search for available activities from a local database and is able to select one or more activities from the search results of the search. In other embodiments, the integrator is able to search a remote database for available activities and is able to select one or more activities from the remote database. In other embodiments, the integrator is able to search for available activities via a command line interface. In other embodiments, a subset of the activities is provided to an integrator based on the selected trigger. In some embodiments, the subset of activities may be filtered from the set of activities based on a context of the process application. In some embodiments, the subset of activities may include activities that use an output of the trigger as an input.

In 408, a selection of an activity is received via a user interface of the process application development platform. In some embodiments, the activity is selected from a list. In other embodiments, the activity is dragged and dropped into a process application workspace. In other embodiments, the integrator is able to select an available activity via a command line interface.

In 410, a list of available activities is provided. In some embodiments, all of the activities stored in a database are provided. In other embodiments, a subset of the activities is provided. For example, only activities that use as input the output of the activity selected at 406 are provided. In other embodiments, the list of available activities does not include the activity selected at 406. For example, the integrator may not create a process flow that includes two instances of the same activity.

Figure 5:
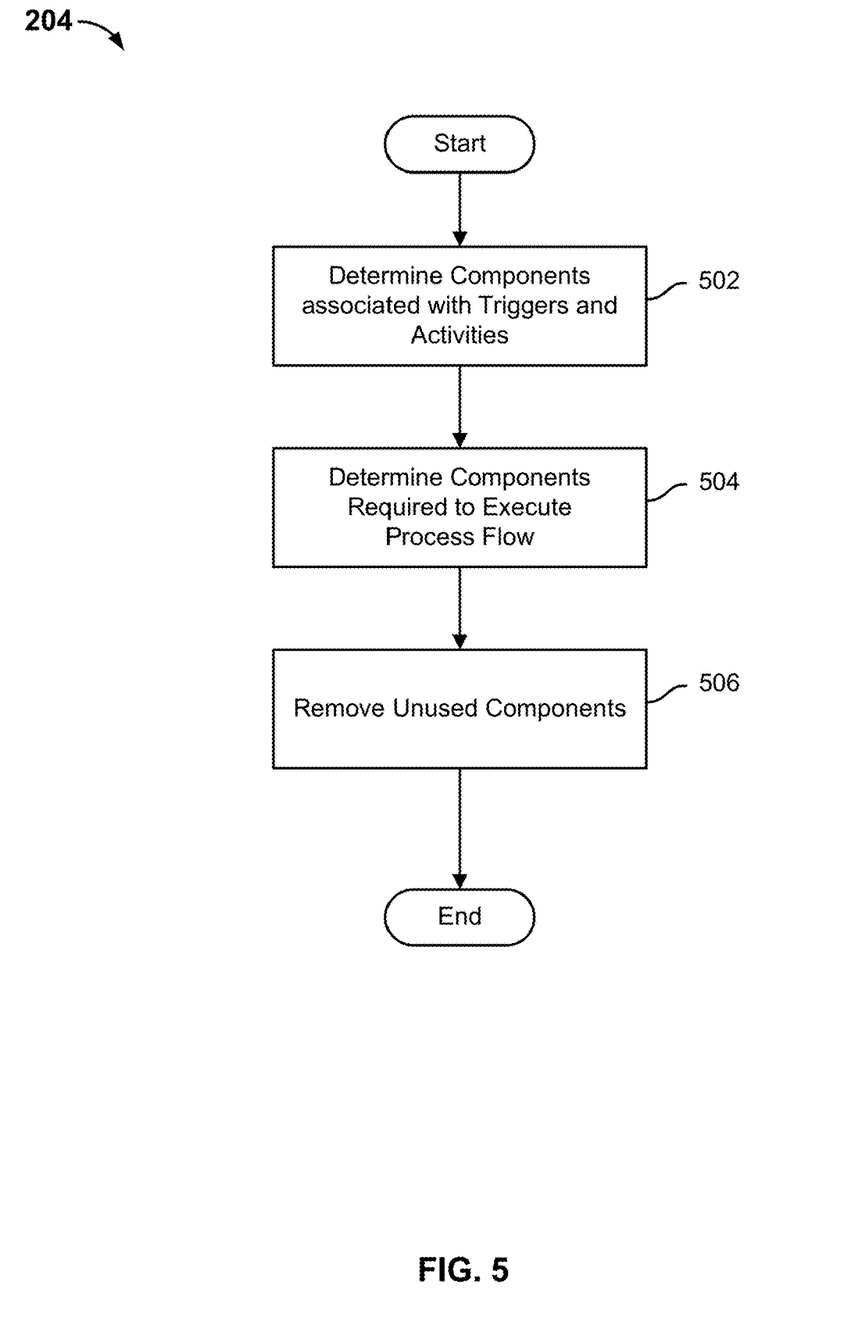
FIG. 5 depicts an embodiment of a process of determining a minimal set of components for a process engine.

FIG. 5 depicts an embodiment of a process of determining a minimal set of components for a process engine. In some embodiments, the process of FIG. 5 is performed by a process application development platform, such as process application development platform 110. In some embodiments, the process of FIG. 5 may be used to perform step 304 of FIG. 3.

In 502, the components of the process flow are determined. In some embodiments, a process flow may include a trigger and one or more activities.

In 504, the process engine components that are or may actually be invoked to carry out the process flow are determined. A pre-compiler, such as pre-compiler 106, may analyze the trigger and activities of a process flow and determine which triggers and/or activities are actually used by the process flow. For example, consider an application Foo that contains Constrained Application Protocol (CoAP) and Hyper Text Transfer Protocol (HTTP) activities. In order to run that application, an engine is custom-built that contains only libraries that are defined and required by these CoAP and HTTP activities. Any libraries related to other activities, such as Java Message Service (JMS) or MQTT (MQ Telemetry Transport) that are available in the design-time to the developer, are not included as part of the process engine that is being built to execute this particular application. In another example, a library that may be associated with supporting Constrained Application Protocol (CoAP) and Hyper Text Transfer Protocol (HTTP) activities may include elements not used by such protocols but which happen to be included in a same library as components that are required by such protocols.

In 506, identified unused process engine components are removed or omitted, e.g., from a set of process components to be included in a process application based on the process flows defined by the user. By excluding a trigger or activity from being included in an executable, any dependent libraries and code associated with the trigger or activity are also excluded from the executable. In some embodiments, the unneeded components may include a library or a portion thereof, function, or component. In other embodiments, the unneeded components may be an activity. In other embodiments, the unneeded components may be part of or an entire branch triggers and activities. For example, consider a process application that consists of 20 activities that are split across three process flows. A portion of the process flow is unreachable because of the nature of the expression that is configured on a path transition between two activities of the process application. The pre-compiler will discard all of the components and dependencies brought along by activities along the unreachable process flow.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
   receiving a selection of a trigger associated with a process application;
   receiving a selection of one or more activities associated with the process application based on the selected trigger;
   determining a minimum set of process engine components needed to perform the process application, wherein the determining further includes:
   analyzing a process flow associated with the selected trigger and one or more activities to identify process engine components associated with the selected trigger and one or more activities respectively;
   determining that, based on the analysis, at least one process engine component of the identified process engine components is not invoked by the process application at runtime, wherein the at least one process engine component is associated with at least one activity of the selected one or more activities, wherein an input of the at least one activity is not output of any of the selected trigger or one or more activities preceding to the at least one activity;
   removing the at least one process engine component from the identified process engine components to form the minimum set of process engine components; and
   compiling the process application into an executable code that includes the determined minimum set of process engine components.

2. The method of claim 1, further comprising deploying the executable code to a device.

3. The method of claim 1, further comprising receiving a set of activities and triggers that define the process application.

4. The method of claim 3, wherein at least one of activities and triggers of the set of activities and triggers is stored locally.

5. The method of claim 3, wherein at least one of the activities and triggers of the set of activities and triggers is stored remotely.

6. The method of claim 1, further comprising:
   filtering a set of available activities based on the selected trigger; and
   providing the filtered set of available activities as selectable options.

7. The method of claim 1, further comprising:
   filtering a set of available activities based on the selected one or more activities; and
   providing the filtered set of available activities as selectable options.

8. The method of claim 1, wherein determining a minimum set of process engine components needed to perform a process application further includes:
   analyzing a process flow associated with each selected one or more activities and trigger to identify one or more branches of activities;
   determining, based on the analysis which, if any, branches of the one or more branches of activities are not invoked by the process application at runtime; and
   removing one or more unused process engine components associated with a branch that is not invoked by the process application from the minimum set of process engine components.

9. The method of claim 1, wherein determining a minimum set of process engine components needed to perform a process application further includes:
   analyzing a process flow associated with each selected one or more activities and trigger to identify one or more libraries;
   determining, based on the analysis which, if any or a portion thereof, of the identified one or more libraries are invoked in the process application at runtime; and
   removing an unused library or portion thereof from the minimum set of process engine components.

10. The method of claim 1, wherein compiling the process application into an executable code based at least in part on the determined minimum set of process engine components further comprises including in the executable code one or more bindings associated with the determined minimum set of process engine components.

11. A system, comprising:
a user interface to receive a selection of a trigger associated with a process application and a selection of one or more activities associated with the process application based on the selected trigger;
a memory including a database stored with the selected trigger and one or more activities received from the user interface and configured to provide a processor with instructions; and
the processor coupled with the user interface and the memory including the database, wherein the processor configured to:
determine a minimum set of process engine components needed to perform the process application, wherein the determining further includes:
analyzing a process flow associated with the selected trigger and one or more activities to identify process engine components associated with the selected trigger and one or more activities respectively;
determining that, based on the analysis, at least one process engine component of the identified process engine components is not invoked by the process application at runtime, wherein the at least one process engine component is associated with at least one activity of the selected one or more activities, wherein an input of the at least one activity is not output of any of the selected trigger or one or more activities preceding to the at least one activity;
removing the at least one process engine component from the identified process engine components to form the minimum set of process engine components; and
compile the process application into an executable code that includes the determined minimum set of process engine components.

12. The system of claim 11, wherein the processor is further configured to receive a set of activities and triggers that define the process application.

13. The system of claim 11, wherein the processor is further configured to:
filter a set of available activities based on the selected trigger; and
provide the filtered set of available activities as selectable options.

14. The system of claim 11, wherein the processor is further configured to:
filter a set of available activities based on the selected activity; and
provide the filtered set of available activities as selectable options.

15. The system of claim 11, wherein to determine a minimum set of process engine components needed to perform a process application, the processor is further configured to:

analyze a process flow associated with each selected one or more activities and trigger to identify one or more branches of activities;
determine, based on the analysis which, if any, branches of the one or more branches of activities are not invoked in the process application at runtime; and
remove one or more unused process engine components associated with a branch that is not invoked by the process application from the minimum set of process engine components.

16. The system of claim 11, wherein to determine a minimum set of process engine components needed to perform a process application, the processor is further configured to:
analyze a process flow associated with each selected one or more activities and trigger to identify one or more libraries;
determine, based on the analysis which, if any or a portion thereof, of the identified one or more libraries are invoked in the process application at runtime; and
remove an unused library from the minimum set of process engine components.

17. A computer program product, the computer program product being embodied in a tangible non-transitory computer readable storage medium and comprising computer instructions for:
receiving a selection of a trigger associated with a process application;
receiving a selection of one or more activities associated with the process application based on the selected trigger;
determining a minimum set of process engine components needed to perform the process application, wherein the determining further includes:
analyzing a process flow associated with the selected trigger and one or more activities to identify process engine components associated with the selected trigger and one or more activities respectively;
determining that, based on the analysis, at least one process engine component of the identified process engine components is not invoked by the process application at runtime, wherein the at least one process engine component is associated with at least one activity of the selected one or more activities, wherein an input of the at least one activity is not output of any of the selected trigger or one or more activities preceding to the at least one activity;
removing the at least one process engine component from the identified process engine components to form the minimum set of process engine components; and
compiling the process application into an executable code that includes the determined minimum set of process engine.

* * * * *